INVENTOR
ROBERT V. MAAG
BY C. G. Stratton
ATTORNEY

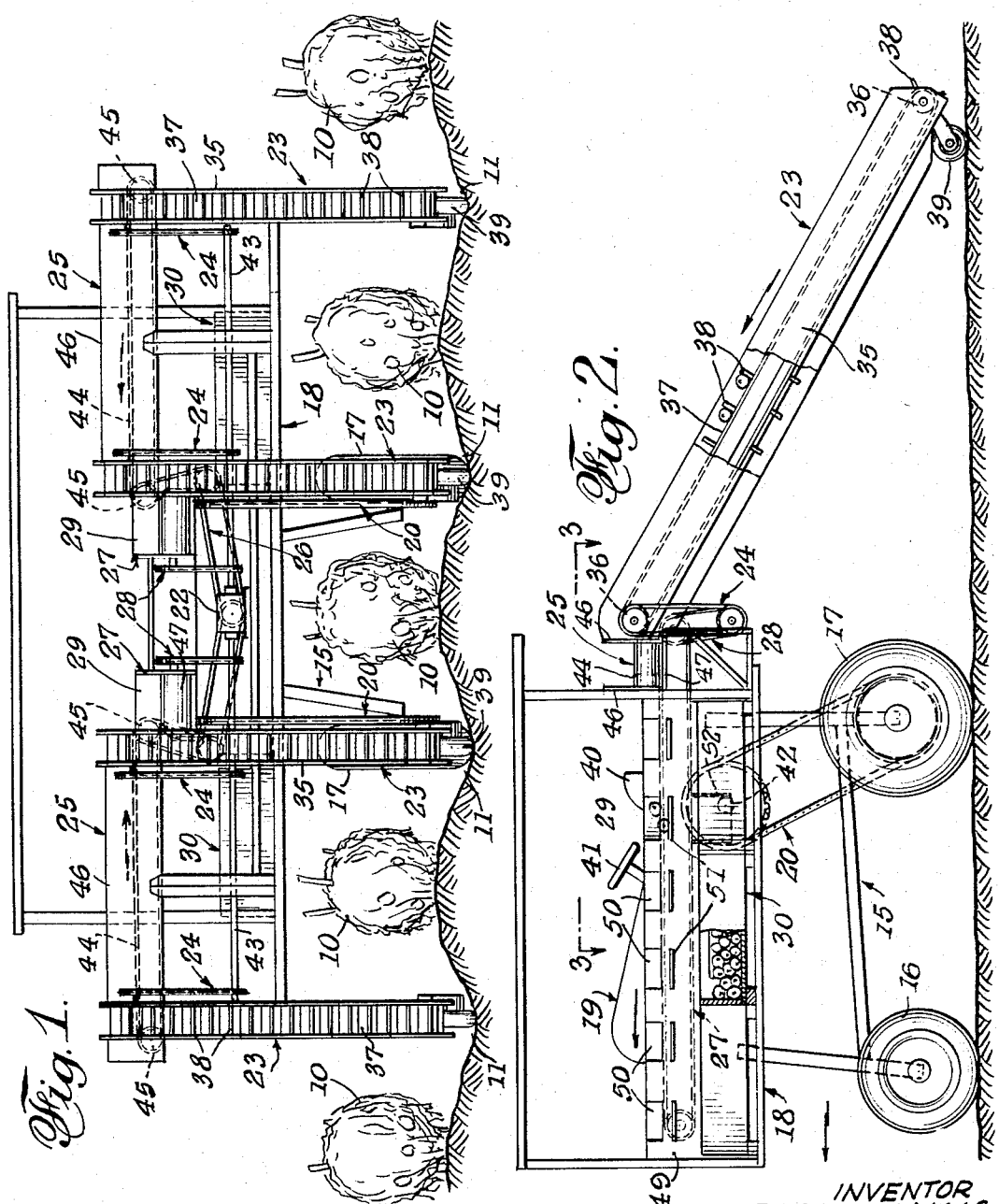

United States Patent Office 3,292,806
Patented Dec. 20, 1966

3,292,806
HARVESTER
Robert V. Maag, P.O. Box 668, Mecca, Calif. 92254
Filed Mar. 25, 1965, Ser. No. 442,630
6 Claims. (Cl. 214—519)

This invention relates to a machine for harvesting fleshy or pulpy fruit, more specifically tomatoes.

An object of the present invention is to provide a tomato harvester that handles hand-picked fruit in such an efficient and gentle manner that the same is transported to bulk bins, replaceably carried by the machine, free of bruises and other surface abrasions.

Another object of the invention is to provide a tomato harvester, especially for poled tomatoes planted in uniformly spaced rows, which is labor-saving in that the pickers are unencumbered with boxes, sacks and other containers and, therefore, are free of weighted items, so they may more efficiently and comfortably perform their task of picking the fruit from the poled plants and, at approximately the same level, depositing the same into the machine for transport to collecting or bulk bins.

A further object of the invention is to provide a tomato harvester, as above characterized, that, by carrying a plurality of removable bulk bins into which the fruit is successively deposited and which require replacement by empty bins only at long time intervals or at stations or places in the field chosen for this purpose, eliminates the labor-consuming and time-wasting chore of individual totage of a bin of hand-picked fruit to the side of the field and the return trip to the area where the fruit is being picked with an empty bin so picking may be continued.

This invention also has for its objects to provide such means that are positive in operation, convenient in use, easily installed in a working position and easily disconnected therefrom, economical of manufacture, relatively simple, and of general superiority and serviceability.

The above objects are realized in a harvester machine that is wheel-mounted at an elevation to clear rows of poled tomatoes with the wheels travelling between the rows, and provided with similar but oppositely arranged sets of conveyors that receive tomatoes from the pickers that follow the machine, elevate them to a height above the floor of the machine (about eight feet, in practice), convey the tomatoes that are discharged by the elevating means transversely toward each other, and the longitudinal center of the machine, and transporting the tomatoes discharged by the transverse conveyor means along parallel longitudinal paths toward the front of the machine. By providing similar complements of bulk bins along the outer sides of the longitudinal conveyor means and providing movable diverters in the paths of the tomatoes on the latter conveyor means, said bins are filled with fruit that are diverted or sheared from their paths of movement, first, into the furthermost bins and, then, successively, into the bins nearer the transverse conveyor means.

The machine is driven continuously as the full complement of bins is filled, it being desired, from time to time, to slow or speed up the machine progress depending on the size of the harvest, generally, and also in different areas of the field.

The bins are designed for handling by fork lifts so their removal from the harvester, when loaded with fruit, may be facilitated. Also, a drop-gate side on each bin simplifies removal of their contents.

The invention also comprises novel details of construction and novel combinations and arrangements of parts, which will more fully appear in the course of the following description and which is based on the accompanying drawings. However, said drawings merely show, and the following description merely describes, one embodiment of the present invention, which is given by way of illustration or example only.

In the drawings, like reference characters designate similar parts in the several views.

FIG. 1 is a rear elevational view of a tomato harvester according to the present invention, the same being shown in operative relationship to several rows of poled tomatoes.

FIG. 2 is a side elevational view, as seen from the left side of FIG. 1.

Figure 3:
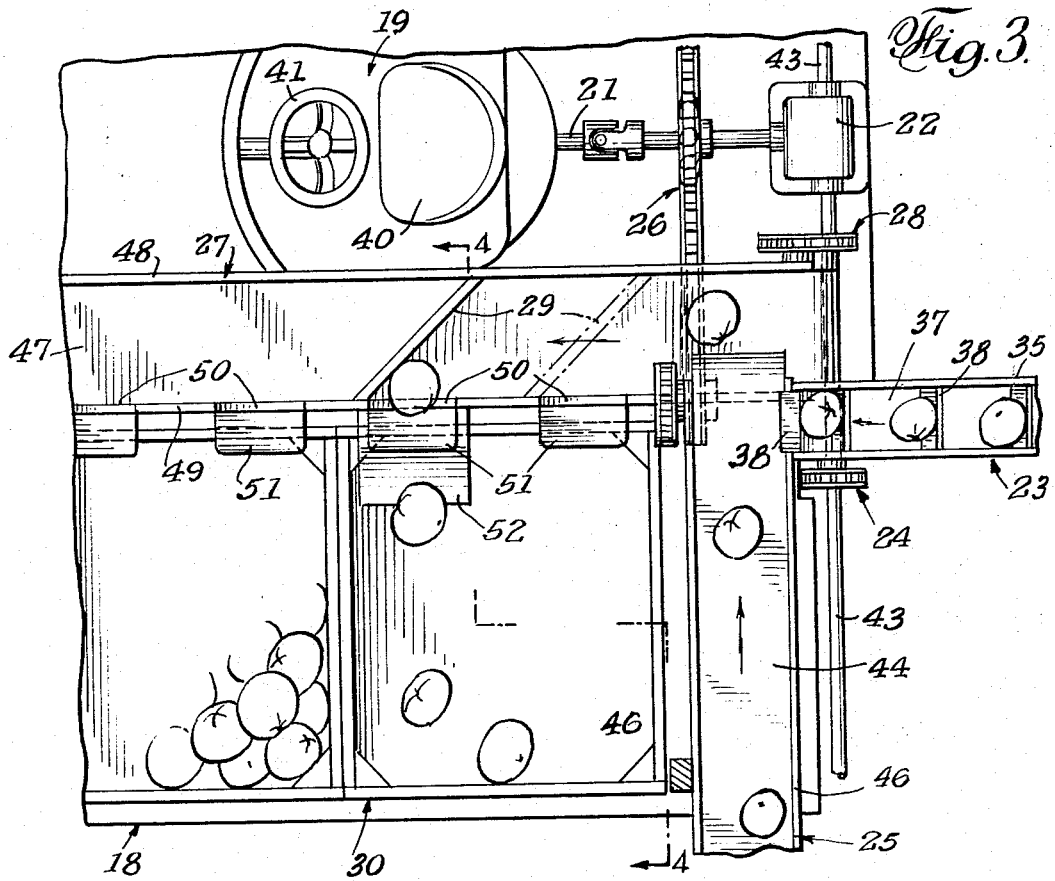
FIG. 3 is an enlarged and broken plan sectional view as taken on the line 3—3 of FIG. 2.

FIG. 1, in stylized form, shows several rows 10 of poled tomatoes with irrigation ditches 11 in the spaces between rows. The present machine is proportioned transversely so the same will straddle at least three such rows 10 and be supported by and travel along said ditches 11.

The harvester that is illustrated comprises, generally, a chassis 15 supported on a pair of front traction wheels 16 and a pair of rear drive wheels 17, a platform 18 carried by the chassis in elevated relation to the ground so that the same is above and clear of the poled tomato plants in the rows 10, a tractor type power plant 19 mounted on the chassis 15 with a drive 20 for the wheels 17 and a power take-off 21 terminating in a one-to-one drive unit 22, a set of transversely spaced and rearwardly trailing elevator conveyors 23 uniformly arranged on opposite sides of the longitudinal center of the machine and connected to the rear of the chassis 15 for receiving tomatoes picked from the plants in said rows for elevation to a level above that of the platform 18, drive means 24 from said unit 22 to said elevator conveyors, a pair of transversely disposed conveyors 25, one on each side of the longitudinal middle of the machine and receptive of tomatoes discharged from the upper ends of the elevator conveyors 23 that, respectively, are on the same side of the middle of the machine, drive means 26 from said power take-off 21 to the conveyors 25 to drive the latter to transport tomatoes thereon toward said machine middle, a pair of parallel shear conveyors 27, one on each side of the power plant 19 and respectively receptive of tomatoes discharged from the adjacent ends of the conveyors 25, drive means 28 from the unit 22 to the conveyors 27 to transport tomatoes thereon in a forward direction, adjustable shear or diverter means 29 to intercept tomatoes on the conveyors 27 and direct the same laterally for discharge from said conveyors, and a complement of bulk bins 30 to receive said diverted tomatoes, the bins being arranged on said platform 18 on opposite outer sides of the shear conveyors 27. Since it is desirable that all of the conveyors 23, 25 and 27 operate at the same speed, it is the shaft 21 that is conventionally speed adjustable.

While four elevator conveyors 23 are shown in FIG. 1, one or more additional elevators may be added on each side, to increase the harvesting capacity of the machine. Each said conveyor is shown as comprising a frame 35 that, at its opposite ends, is provided with rollers 36, a conveyor belt 37, provided with tomato-supporting cleats 38, being trained over said rollers in the usual way. The lower end of each frame 35 is shown as provided with a traction wheel 39 to keep said ends of the elevators off the ground. Since pickers stoop to varying degrees, depending on the portions of the tomato plants from which the fruit is picked, the present machine considerably eases their task, because it is not necessary, each time that a piece of fruit is picked, to either straighten, stoop further, or walk to and from a fruit-receiving bin lying on the ground between rows of plants and frequently quite remote from where the fruit was picked. By maintaining a position close to the lower end of a conveyor, as the machine is driven slowly forward, the picker may deposit the fruit onto the conveyor at approximately the same level at which it was picked. Continual stooping and straightening are, thereby, obviated, as above indicated.

The progress of the machine is controlled by an operator in the seat 40 provided on the power plant 19, said plant including a steering wheel 41 for controlling the steerable wheels 16 and a conventional transmission terminating in a drive shaft 42 for selecting the speed of wheels 17, as driven by the drive 20 from said shaft 42. Whether the harvester is driven continuously forward or is stopped and started according to the size of the harvest, the take-off shaft 21 and unit 22 continue to operate. Hence, the means 24, shown as a chain and sprocket drive between a shaft 43, extending from each side of said unit, and each upper conveyor roller 36, drives the conveyors 23 continually, the latter stopping only when shaft 21 is stopped by the operator.

The conveyors 25 are disposed at a level somewhat below the top of the conveyors 23. Therefore, the latter discharge tomatoes onto the belts 44 which, like the conveyors 23, are trained around end rollers 45. Each conveyor 25, as indicated, receives the fruit dropped but a few inches from the conveyors 23. FIG. 3 shows best how the conveyor 25 transports fruit transversely toward the middle of the harvester, as represented by the power plant 19, for discharge from the inner end thereof onto the conveyor 27 on the near side of said middle. The conveyors 25 may also be driven from the unit 22. However, to simplify the illustration, these conveyors are shown as driven directly from the take-off shaft 21.

The drive 26 may take any suitable form. In this case, the same is shown as a compound chain and sprocket arrangement, extends from shaft 21 to the near end roller 45 by first extending beneath the adjacent end of the conveyor 27 and then upwardly to said near roller 45.

The conveyors 27, except that they extend longitudinally at a level just below the level of the conveyors 25, may be of similar belt and roller construction with the chain and sprocket drives 28 operating the same from the shaft 43.

The frames 35 of the elevator conveyors 23 are formed with side wall portions that laterally enclose the belts 37. The belts 44 of the conveyors 25 are similarly enclosed by walls 46. On the side of each conveyor 27 toward the middle of the machine, the belts 47 thereof are closed by walls 48. The outer sides are closed by walls 49 in which openings 50 are formed, said openings constituting discharge ports for tomatoes on the conveyors 27 that are diverted or sheared from their normal path of movement toward the front ends of said conveyors.

Figure 4:
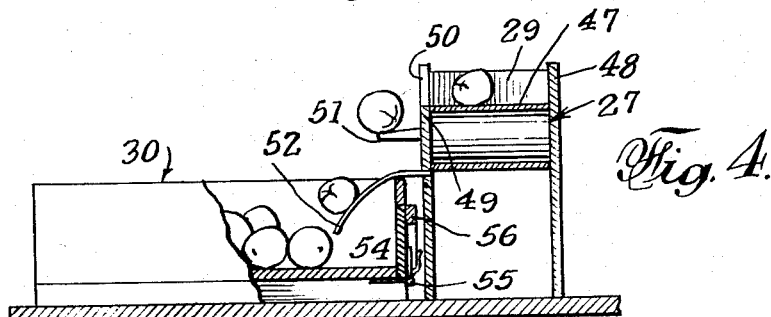
FIG. 4 is a transverse sectional view as taken on the line 4—4 of FIG. 3.
Figure 5:
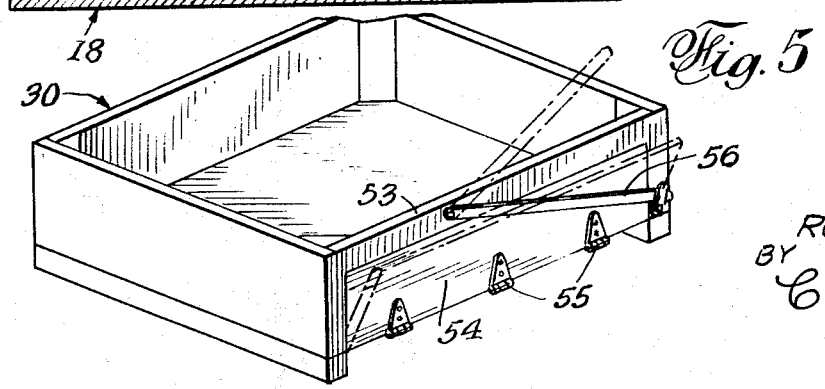
FIG. 5 is a perspective view of a bulk bin such as used in the present machine to collect the harvested tomatoes.

The diverter means 29 is shown in FIGS. 3 and 4 as comprising a wall member, that extends at a rearward and outward angle from the inner side wall 48 to the outer side wall 49. Said diverter wall 29 is movable, as desired, to cause fruit diversion through any one of the ports 50. In practice, the first position is usually in relation to the frontmost port 50 so that the tomatoes are allowed to be transported to the front end before shearing or diversion. As the bin 30, receptive of this fruit, is being filled, the fruit by-passes the other ports. The bins are thus filled successively by moving the wall 29 rearward to cause diversion of fruit through the next rearward port and so on until all of the bins 30 have been filled to a desired level. The operation may be reversed, if desired, since fruit is diverted only from the port adjacent which the wall 29 is placed.

It will be noted that the bins 30 are moved to and from fruit-receiving position from the sides of the platform 18. They are not necessarily secured in place, merely rest upon the platform so that manually or by fork lift, the same can be readily slid into and out of operative position.

To avoid bruising of the fruit, ledges 51 are provided beneath the ports to break the fall of the fruit before the same drops into the bulk bins 30. As shown, a pliable member 52 may be interposed between the ledge 51 that is receiving fruit and the bin therebeneath, said member serving as a buffer which further softens the fall of fruit into the bin.

In the above manner, the full complement of bins 30 are filled with fruit in a continuous operation as the machine progresses along the ditches between the rows of plants. All of the filled bins may be replaced with empties at the same time, but this does not preclude exchanging any bin, filled or not, with another at any time except when the same is receiving fruit from one of the conveyors 27.

The bins 30 are preferably rectangular and relatively shallow, since piling fruit to high levels is not desired since crushing thereof may ensue. By providing one wall 53 of each bin with a hinged gate 54 that swings open downwardly on hinges 55 upon lifting of a lock bar 56, the fruit in the bin may be allowed to roll out and the bin emptied.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A harvester for pulpy fruit comprising:
 (a) a wheel-borne chassis with a platform elevated above the ground on which the wheels of the chassis travel, and mounting a power plant to drive said wheels and having a power take-off shaft,
 (b) a plurality of elevator conveyors extending rearwardly from the rear of said chassis and trailing on the ground between rows of plants bearing such fruit, said elevators being receptive of fruit removed from the plants by pickers trailing the conveyors,
 (c) a pair of transverse conveyors on the chassis above the platform, moving oppositely to each other, and receptive of fruit discharged from the upper end of the elevator conveyors,
 (d) a pair of parallel shear conveyors on said chassis positioned to receive fruit from the transverse conveyors and to transport the same in a direction toward the front of the chassis,
 (e) adjustable means to divert fruit from the shear conveyors laterally toward both sides of the chassis,
 (f) two rows of bulk bins along the outer sides of the shear conveyors to receive fruit diverted from the latter conveyors, and
 (g) drive means connecting all the conveyors to the take-off shaft of the power plant to drive said conveyors.

2. A harvester according to claim 1 in which the power plant is disposed at the longitudinal middle of the chassis, and the elevator conveyors are arranged as two equal parts on each side of said middle of the chassis.

3. A harvester according to claim 2 in which the transverse conveyors are arranged on opposite sides of the middle of the chassis, each said transverse conveyor being disposed to receive fruit discharged from the elevator conveyors on the same side.

4. A harvester according to claim 1 in which the shear conveyors are arranged one on each side of the power plant, the latter being disposed at the longitudinal middle of the chassis.

5. A harvester according to claim 1 in which the bulk bins are supported by the mentioned platform and are slidingly movable from the opposite sides of the platform into and out of fruit receiving position.

6. A harvester according to claim 1, means interposed between the shear conveyors and the bulk bins to buffer the fall of fruit from the latter conveyors into the bottom of the bulk bins.

References Cited by the Examiner

UNITED STATES PATENTS

| | | | |
|---|---|---|---|
| 2,139,877 | 12/1938 | Brandt | 198—79 |
| 2,169,521 | 8/1939 | Chong | 198—79 |

GERALD M. FORLENZA, *Primary Examiner.*

A. J. MAKAY, *Assistant Examiner.*